UNITED STATES PATENT OFFICE.

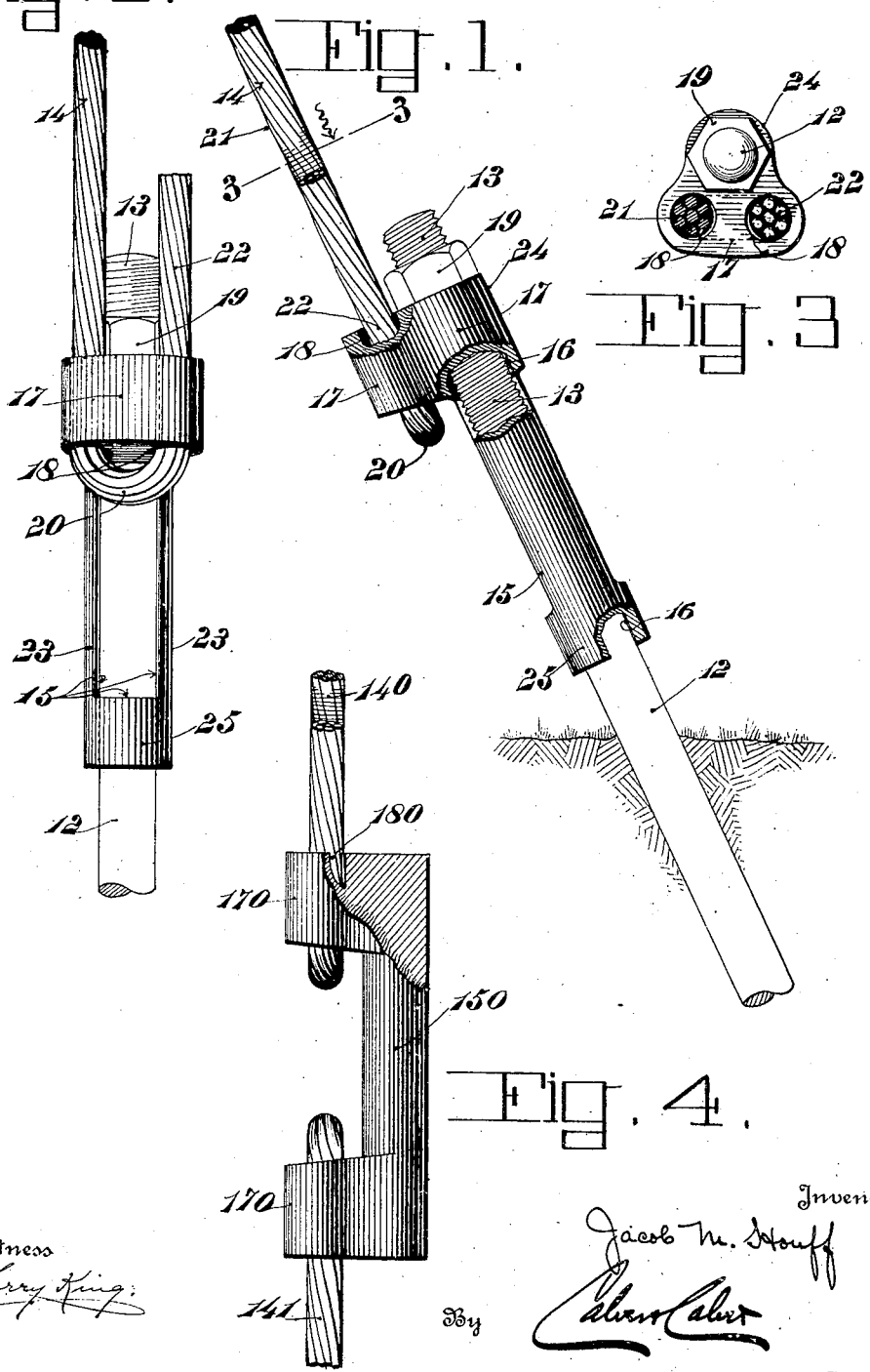

JACOB M. HOUFF, OF MADISON, VIRGINIA, ASSIGNOR OF ONE-HALF TO PETER L. HARGETT, OF FREDERICK, MARYLAND.

CABLE-JOINT.

1,251,375.      Specification of Letters Patent.      Patented Dec. 25, 1917.

Application filed May 5, 1917. Serial No. 166,519.

*To all whom it may concern:*

Be it known that I, JACOB M. HOUFF, a citizen of the United States, residing at Madison, in the county of Madison and State of Virginia, have invented or discovered certain new and useful Improvements in Cable-Joints, of which the following is a specification, reference being had therein to the accompanying drawings.

This invention relates to couplings or joints for connecting or attaching the ends of cables and similar members to one another, or to other parts to which they are to be secured, being particularly designed for the purpose of securing the cables or the like constituting the bracing or guy members for towers, silos, masts, and similar structures to their anchoring means, although obviously capable of use for other purposes.

The invention has for its object the provision of a convenient and efficient joint or coupling of this character of simple and inexpensive construction, comprising a minimum number of parts, which is of such a character as to permit the connection to be adjusted, as for the purpose of taking up slack in the cable, by a very simple operation.

The foregoing and other objects of the invention, together with means whereby the same may be carried into effect, will best be understood from the following description of certain forms or embodiments thereof illustrated in the accompanying drawings, in which:

Figure 1 is a side elevation, partly broken away, of a joint constructed and arranged in accordance with the invention.

Fig. 2 is an elevation substantially at right angles to Fig. 1, looking from the left in the latter figure.

Fig. 3 is a section on the line 3—3, Fig. 1.

Fig. 4 is a view similar to Fig. 1 illustrating another embodiment of the invention.

Figs. 1 and 3 illustrate a form of joint suitable for connecting a guy or bracing member to its anchoring means. In said figures, 12 denotes an anchoring rod having its lower end suitably secured in the ground by well-known means and provided with a threaded upper end 13. 14 denotes a wire or similar cable or the like constituting the bracing or guy member. The rod 12 and cable 14 (which are substantially parallel to each other) are connected by a coupling member comprising a body portion 15 having a longitudinal bore 16 to receive the rod 12 and, at its upper end, a laterally extending lug 17 provided with a pair of apertures 18 arranged side by side with their axes substantially parallel to the axis of the bore 16, and consequently to the length of the body portion 15. Upon the upper threaded end 13 of the rod 12 is a nut 19 which engages the outer end of the coupling member and therefore retains said coupling member in position on said rod. The lower or free end of the cable 14 is doubled upon itself as at 20 to form two substantially parallel portions 21 and 22 which pass in opposite directions through the apertures 18, respectively.

As shown in a somewhat exaggerated manner in Figs. 1 and 3, the diameter of the cable is preferably slightly less than that of the apertures 18, so that the cable engages the apertures loosely or with an easy sliding fit. It is found, however, that particularly in the case of a relatively stiff and heavy rope or cable, such as in usually used for guy members, the cramping action of the doubled portion of the cable upon the coupling member, induced by bending the former at 20 and passing the portions 21 and 22 thereof in opposite directions through the apertures 18, is amply sufficient to hold the cable 14 against slipping in the coupling member; that is to say, against movement with respect to said member, when the joint as a whole is submitted to tension. The nut 19 may therefore be tightened to move the coupling member downwardly on the rod 12, or in the direction of the length of the cable 14, thereby applying tension to said cable.

It sometimes happens in a joint of this character that a greater range of movement of the cable end is desired than can conveniently be provided for by the length of the threaded end of the anchor rod. Thus, for example, in straightening up a structure which has become distorted, it may be necessary to take up considerable slack in the cable 14. This, in the construction shown herein, may be conveniently accomplished by removing the nut 19, slipping the coupling member upwardly on the cable 14 until the end 22 is freed from its aperture 18, straightening the bend 20, bending the cable at a different point, reinserting the end 22 in its aperture 18, and replacing and tightening the nut 19.

In the construction above described, in order to reduce the weight of the coupling member and save metal, the body portion 15 thereof is cut away intermediate its ends, at its opposite sides, from its outer surface to the bore 16, leaving at its opposite ends annular portions 24 and 25 surrounding the rod 12 and connected by parallel arms 23 which, in practice, are found sufficient to transmit the necessary tension. In this construction the lug 17 extends laterally from the upper annular portion or member 24.

In Fig. 4 is shown a form of coupling suitable for connecting the ends of two cables to one another. Said coupling comprises a body portion 150 provided at either end with a laterally extending lug 170, each of said lugs being provided with a pair of parallel perforations 180 through which the doubled portions of the cables 140 and 141 pass, as in the construction first described. In this form of the invention, as shown, the body portion 150 is made solid. It will be seen that tension applied to either of the cables 140 or 141 will be transmitted through the coupling member, the cramping action of the doubled portions of said cables holding them firmly against slipping in said coupling member.

Having thus described my invention I claim and desire to secure by Letters Patent:—

1. A rope or cable joint comprising a coupling member having a pair of parallel apertures, a relatively stiff rope or cable extending in the direction of the axes of said apertures, doubled upon itself, and passing in opposite directions through said apertures, respectively, said rope or cable being held against movement with respect to said coupling member by the cramping action of the doubled portion thereof upon said member, and means coöperating with said member for moving the same in the direction of the length of said rope or cable to apply tension to the latter.

2. A rope or cable joint comprising a coupling member consisting of a body portion having a longitudinal bore and a laterally extending lug provided with a pair of apertures arranged side by side with their axes substantially parallel to the axis of said bore, a rope or cable extending in the direction of the axes of said apertures and bore, doubled upon itself, and passing in opposite directions through said apertures, respectively, a rod extending through said bore and having a threaded end, and a nut on said threaded end.

3. A rope or cable joint comprising a relatively stiff rope or cable, and a coupling member including a body portion having attaching means and a laterally extending portion provided with a pair of apertures arranged side by side and extending through said member in a direction substantially parallel to said rope or cable, said rope or cable being doubled upon itself and passing loosely in opposite directions through said apertures, respectively, and being held against movement with respect to said coupling member by the cramping action of the doubled portion thereof upon said member.

4. A rope or cable joint comprising a coupling member including a body portion having a laterally extending lug provided with a pair of apertures arranged side by side and extending through said lug in a direction substantially parallel to the length of said body portion, and a relatively stiff rope or cable extending in the direction of the axes of said apertures, doubled upon itself, and passing loosely in opposite directions through said apertures, respectively, said cable being held against movement with respect to said coupling member by the cramping action of the doubled portion thereof upon said member.

In testimony whereof I affix my signature.

JACOB M. HOUFF.

Copies of this patent may be obtained for five cents each, by addressing the "Commissioner of Patents, Washington, D. C."